US005640412A

United States Patent [19]

Reed

[11] Patent Number: 5,640,412
[45] Date of Patent: Jun. 17, 1997

[54] PRISM FOLDED LASER CAVITY WITH CONTROLLED INTRACTIVITY BEAM POLARIZATION

[75] Inventor: Edward D. Reed, Sunnyvale, Calif.

[73] Assignee: Coherent, Inc., Santa Clara, Calif.

[21] Appl. No.: 673,409

[22] Filed: Jul. 9, 1996

Related U.S. Application Data

[63] Continuation of Ser. No. 409,277, Mar. 23, 1995, abandoned.

[51] Int. Cl.⁶ .................................................. H01S 3/08
[52] U.S. Cl. ........................ 372/100; 372/12; 372/19; 372/93; 372/27
[58] Field of Search ........................ 372/100, 93, 98, 372/12, 19, 27, 92

[56] References Cited

U.S. PATENT DOCUMENTS

| 4,050,035 | 9/1977 | Wuerker et al. ............... 372/93 |
| 4,408,334 | 10/1983 | Lundstrom ..................... 372/93 |
| 4,546,477 | 10/1985 | Richards ....................... 372/93 |
| 4,740,986 | 4/1988 | Reeder .......................... 372/93 |
| 4,884,044 | 11/1989 | Heywood et al. ............. 372/12 |
| 5,226,054 | 7/1993 | Yarborough et al. ......... 372/100 |
| 5,504,763 | 4/1996 | Bischel et al. ................ 372/27 |

FOREIGN PATENT DOCUMENTS

| 61-47684 | 3/1986 | Japan ................ H01S 3/125 |
| 61-82491 | 4/1986 | Japan ................ H01S 3/115 |

OTHER PUBLICATIONS

V.M. Podgaetskii, "Application of the Jones Method for Computation of the Electrooptical–Shutter Characteristics in a Laser with Porro Prisms as Reflectors," *Opt. Spectrosc.*, Jan. 1969, vol. 26, pp. 153–155.

M.K. Chun & E.A. Teppo, "Laser resonator: an electrooptically Q–switched Porro prism device," *Applied Optics*, Aug. 1976, vol. 15, No. 8, pp. 1942–1946.

International Search Report, mailed Jun. 26, 1996, for International Application No. PCT/US96/03646, with an International filing date of Mar. 18, 1996, 5 pages in length.

I. Singh, A. Kumar & O.P. Nijhawan, "Design of a high–power Nd:YAG Q–switched laser cavity," *Applied Optics*, Jun. 20, 1995, vol. 34, No. 18, pp. 3349–3351.

*Primary Examiner*—Leon Scott, Jr.
*Attorney, Agent, or Firm*—Limbach & Limbach L.L.P.

[57] ABSTRACT

A folded Q-switched laser cavity uses total internal reflections of prisms to fold the intracavity beam. The index of refraction and the orientation of the prisms are selected to induce a predetermined phase delay between the two orthogonal polarization components of the linearly polarized intracavity beam. The predetermined phase delay rotates the intracavity beam polarization to an orthogonal direction such that an intracavity polarizer rejects the beam and the laser is held off from lasing. An electro-optic Q-switch cell is intermittently turned "on" whereby a second predetermined phase delay is induced onto the intracavity beam. The combination of the two predetermined phase delays results in a beam polarization orientation that is not rejected by the polarizer and the laser is not held off from lasing.

36 Claims, 7 Drawing Sheets

| PHASE DELAY (DEGREES) | RESULTING POLARIZATION | | RESULTING LINEAR POLARIZATION ROTATION |
|---|---|---|---|
| | TYPE | GRAPHICAL | |
| 0° | LINEAR | / | 0° |
| 45° | ELLIPTICAL | ⬭ | — |
| 90° | CIRCULAR | ○ | — |
| 135° | ELLIPTICAL | ⬭ | — |
| 180° | ORTHOGONALLY LINEAR | \ | 90° |

FIG. 2

PRISM FOLDED LASER CAVITY WITH CONTROLLED INTRACTIVITY BEAM POLARIZATION

This is a continuation of application Ser. No. 08/409,277 filed on Mar. 23, 1995 now abandoned.

FIELD OF THE INVENTION

The present invention relates to laser systems, and in particular to a folded cavity Q-switched laser system.

BACKGROUND OF THE INVENTION

A Q-switched laser produces pulses of light at high peak powers. An intra-cavity shutter is closed, preventing laser action and allowing the energy in the laser gain medium to build up. The shutter is then opened quickly, causing the rapid build-up of the pulse of laser light. Such a shutter is called a Q-switch.

A conventional Q-switched laser system 2 is illustrated in FIG. 1. The laser system 2 includes a resonant cavity formed by two optics: a high reflecting mirror (HR) 4 and an output coupling mirror (OC) 6. A gain medium 8 is placed inside the cavity. When a flashlamp means 9 for exciting the gain medium 8 is activated without a Q-switch device activated, an intracavity laser beam 10 is produced that circulates between the HR 4 and the OC 6. The laser beam 10 is amplified twice during each round trip through the cavity as it traverses the excited gain medium 8. The OC 6 partially transmits a predetermined amount of the intracavity beam 10 to create the output beam 12.

The polarizer 14 linearly polarizes the intracavity beam 10 by offering low optical loss for one (preferred) polarization component and high optical loss for the orthogonal one (non-preferred) polarization component. Under these conditions, beam 10 is forced to build up in the preferred polarization direction only.

Pulsed output is created by intermittently "holding off" the laser. When the losses in the cavity exceed the gain produced by the gain medium 8, lasing in the cavity ceases, and the laser is "held off". When gain exceeds losses, lasing begins again.

To hold off a high gain laser, an electro-optic Q-switch device (EO cell) 16 is placed in the cavity. When high voltage is applied to the EO cell 16 by driver 17 (the cell is on), it acts as a wave plate, thereby having a slow polarization axis and a fast polarization axis. Light polarized in the direction of the slow polarization axis travels slower through the EO cell 16 and becomes phase delayed relative to light polarized in the direction of the fast polarization axis, which travels faster through the EO cell 16. When no voltage is applied to the EO cell 16 (the cell is off), no phase delay occurs. The phase delay induced by an EO cell 16 is proportional to the voltage applied to the EO cell 16.

FIG. 2 illustrates the gradual polarization changes caused by various phase delays induced upon linearly polarized light having a polarization direction 45° to the fast and slow axes of an EO cell 16. As the phase delay is increased from 0°, elliptically polarized light is created. The elliptical polarization becomes circularly polarize light when the phase delay is 90°. As the phase delay is increased from 90°, elliptically polarized light is created whereby the elongated axis is orthogonal to the elongated axis of the elliptical polarized light created by phase delays of less than 90°. At 180° of phase delay, linearly polarized light is created which is orthogonal to the linearly polarized light at 0° phase delay. Accordingly, a phase delay of 180° results in a 90° rotation of the linear polarization direction.

The phase delay effect of the EO cell 16 is used to rotate the linear polarization direction of the intracavity beam 10 by 90° such that the polarizer 14 rejects the beam. The loss produced by the polarizer 14 is sufficient to hold off the laser. When the EO cell 16 is in its "off" state, there is no polarization rotation, and the laser is no longer held off.

While the laser is held off and the gain medium 8 is being excited (pumped), a large amount of energy is stored in the gain medium 8, since there is no intracavity laser beam to extract such energy. When the Q-switch state is changed quickly, losses drop and lasing begins. The intracavity beam 10 quickly builds and extracts the stored energy thereby producing a very high power light pulse.

In the embodiment shown in FIG. 1, the EO cell 16 is turned off to generate the pulse, and turned on to hold off the laser. There are drawbacks to this type of design. First, an EO cell driver 17 is required that can rapidly switch the high voltage off to turn off the EO cell 16 fast enough to generate the shortest light pulse. It is easier to design a driver 17 that turns the high voltage on quickly, rather than one that turns the high voltage off quickly. Secondly, a high voltage must be applied to the EO cell 16 during the relatively long period of time while the optical gain medium is being pumped. Since EO cells tend to degrade when high voltages are excessively applied, it is not beneficial to have the Q-switch turned on to hold off the laser.

The above mentioned problems are solved by inserting a quarter-wave plate 18 into the cavity, as shown in FIG. 3, where the laser is held off when the EO cell 16 is off, and the light pulse is generated when the EO cell 16 is turned on. During a round trip, the quarter-wave plate 18 rotates the beam polarization by 90°, which holds off the laser. When the EO cell is turned on, it either adds an additional 90° polarization rotation, or it adds a polarization rotation equal and opposite to the quarter-wave plate induced rotation, either of which switches the laser on. Therefore, a less complicated driver can be used, and degradation of the EO cell can be avoided (since the EO cell voltage is applied only when the pulse is being generated). The drawback to this cavity configuration is the requirement of an additional intracavity element.

There is a need for a Q-switched laser that does not use an intracavity passive quarter-wave plate whereby the pulse is generated when the EO cell 16 is turned on, and the laser is held off when the EO cell 16 is off.

A drawback to both of the above described embodiments is that the cavity is too long for many applications. Simply shortening the cavity is not a viable solution because certain intracavity dimensions are required to obtain the desired output beam 12. For example, shortening the cavity can increase the divergence of the output beam 12.

A prior art solution to reduce the dimensions of the cavity is a folded cavity configuration, as illustrated in FIG. 4. Two turning mirrors 20 are used to create a "U" shaped cavity, thereby reducing the overall length of the laser head. The use of turning mirrors 20 in the cavity, however, presents several problems. First, intracavity mirrors 20 coated to reflect at 45° can damage easily. The high intracavity powers, especially with Q-switched lasers, can degrade such optical coatings. Further, and more importantly, 45° turning mirrors 20 alter the polarization state of the reflected intracavity beam in a way that is difficult to control. The effect on the polarization state can vary from one coating to the next for the same optical coating design. Therefore, laser cavities sensitive to the polarization of the intracavity beam, such as EO cell Q-switched lasers, cannot use folding mirrors without degradation to laser performance and reliability.

There is a need for a folded laser cavity in which the turning optics do not alter the polarization state of the intracavity beam in an uncontrollable way, and are more reliable than 45° surface coated optics.

SUMMARY OF THE INVENTION

The present invention solves the aforementioned problems by using prisms to turn the intracavity laser beam in a folded Q-switched laser cavity.

The Q-switched laser cavity of the present invention includes a folded resonant cavity having a gain medium, a polarizer, an EO cell, and turning prisms. The turning prisms reflect the intracavity beam by total internal reflection (TIR). Each TIR phase shifts the beam by a known, controllable amount, depending upon angle of incidence and refractive index of the prisms. The angle of incidence and refractive index are selected to induce a predetermined phase delay of 180° in the linearly polarized intracavity beam during each round trip. The resulting beam after the phase delay is therefore polarized orthogonally to its original polarization direction, which is subsequently rejected by the polarizer to hold off the laser. The EO cell is then turned on to induce an additional 180° phase delay, or subtract out the 180° prism induced phase delay, during each round trip. The resulting beam has a polarization orientation that is not rejected by the polarizer.

The EO cell is turned on to create the laser beam pulse, and turned off to hold off the laser. Therefore, a passive quarter-wave plate is not required inside the cavity to utilize a simplified EO cell driver.

An alternate embodiment of the present invention includes a polarization sensitive gain medium, wherein a separate intracavity polarizer element is not needed in the cavity. Such a gain medium amplifies two orthogonal polarization components, but one much more than the other. The result is that the lesser amplified polarization component never oscillates in the cavity because the gain for that component never reaches the cavity losses. Therefore, the gain medium causes linearly polarized light to oscillate in the cavity without the use of linear polarizer.

BRIEF DESCRIPTION OF THE DRAWINGS

FIG. 2 is a table illustrating the effect on the polarization of a linearly polarized laser beam having a polarization direction oriented at 45° from the fast and slow axes of an electro-optic cell, for various amounts of phase delay.

DETAILED DESCRIPTION OF THE PREFERRED EMBODIMENTS

Figure 1:
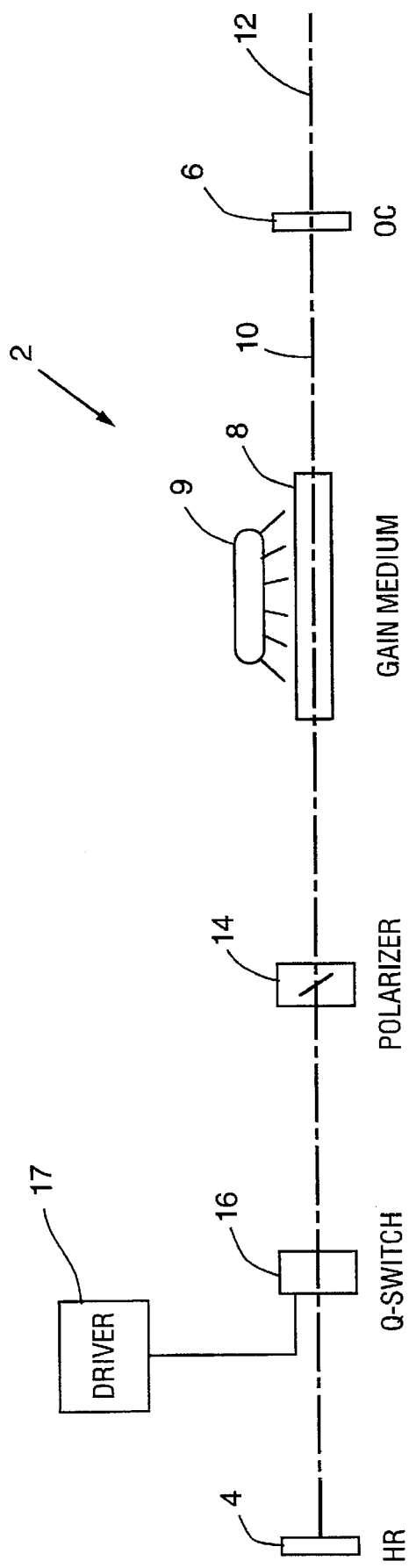
FIG. 1 is a top plan view of a prior art Q-switch laser cavity.
Figure 3:
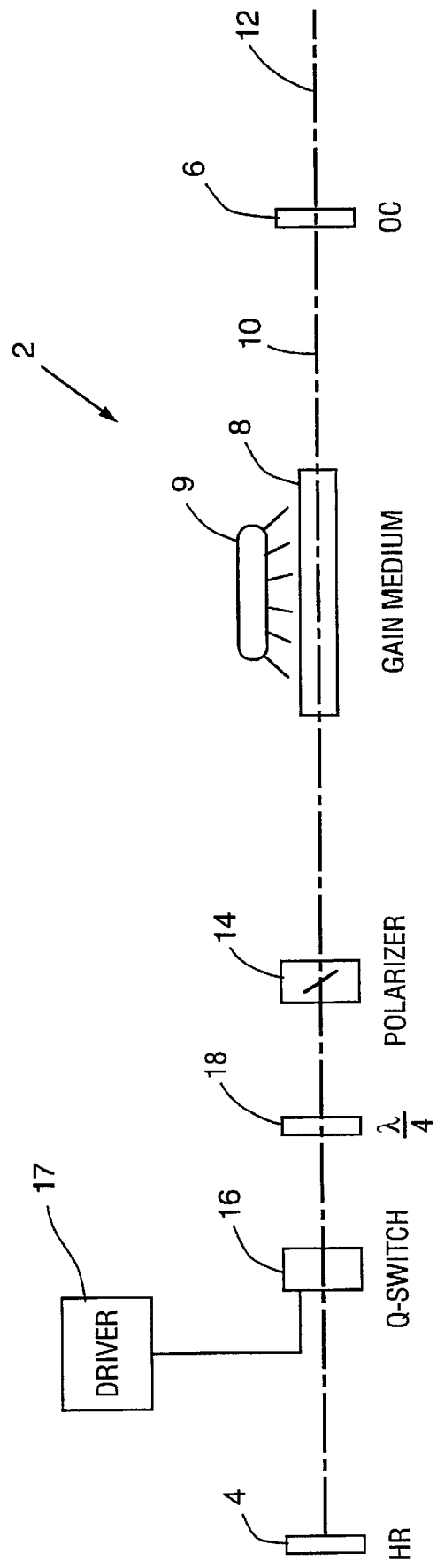
FIG. 3 is a top plan view of a prior art Q-switched laser cavity including a quarter-wave plate.
Figure 4:
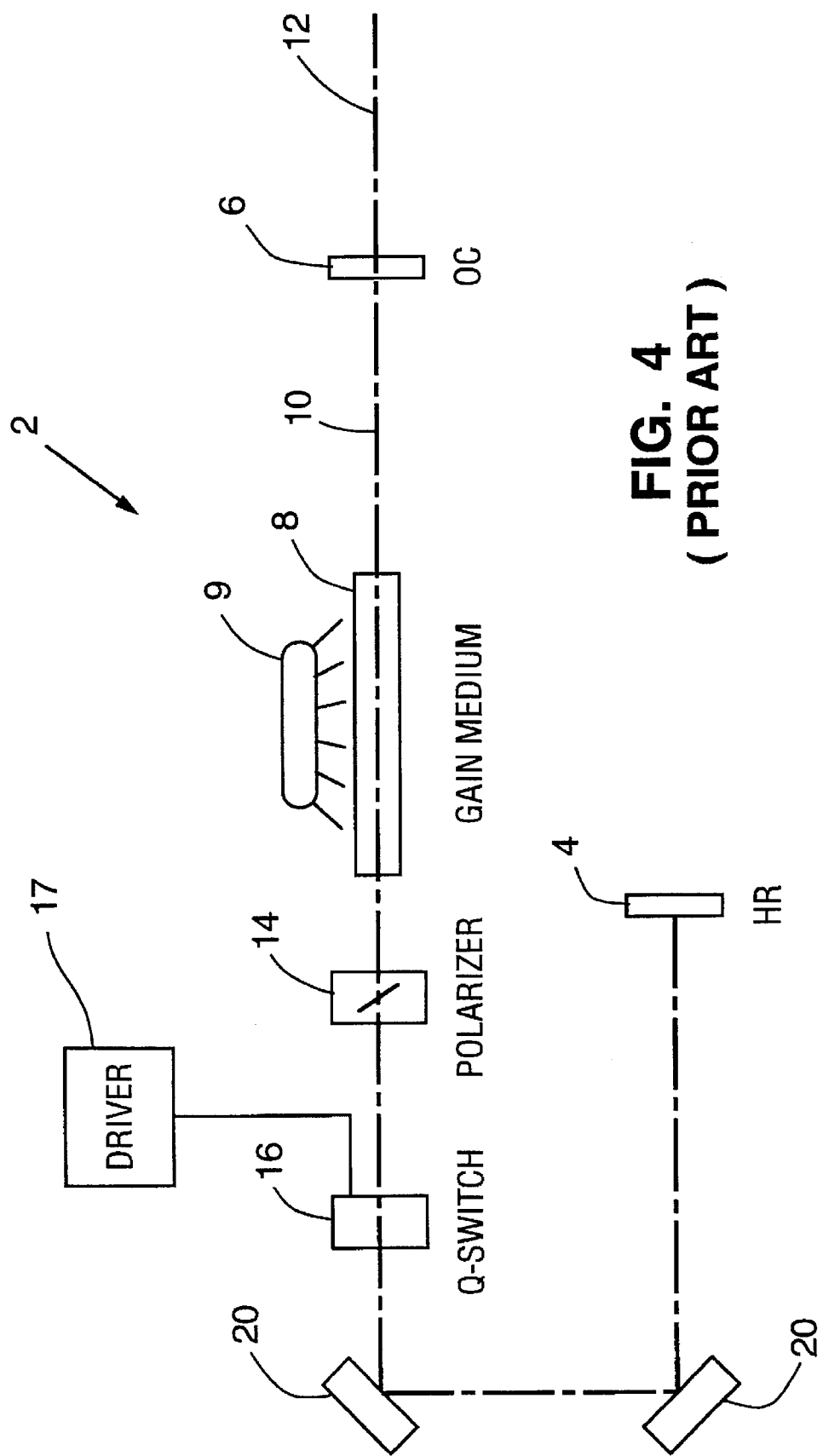
FIG. 4 is a top plan view of a prior art folded Q-switched laser cavity.
Figure 5:
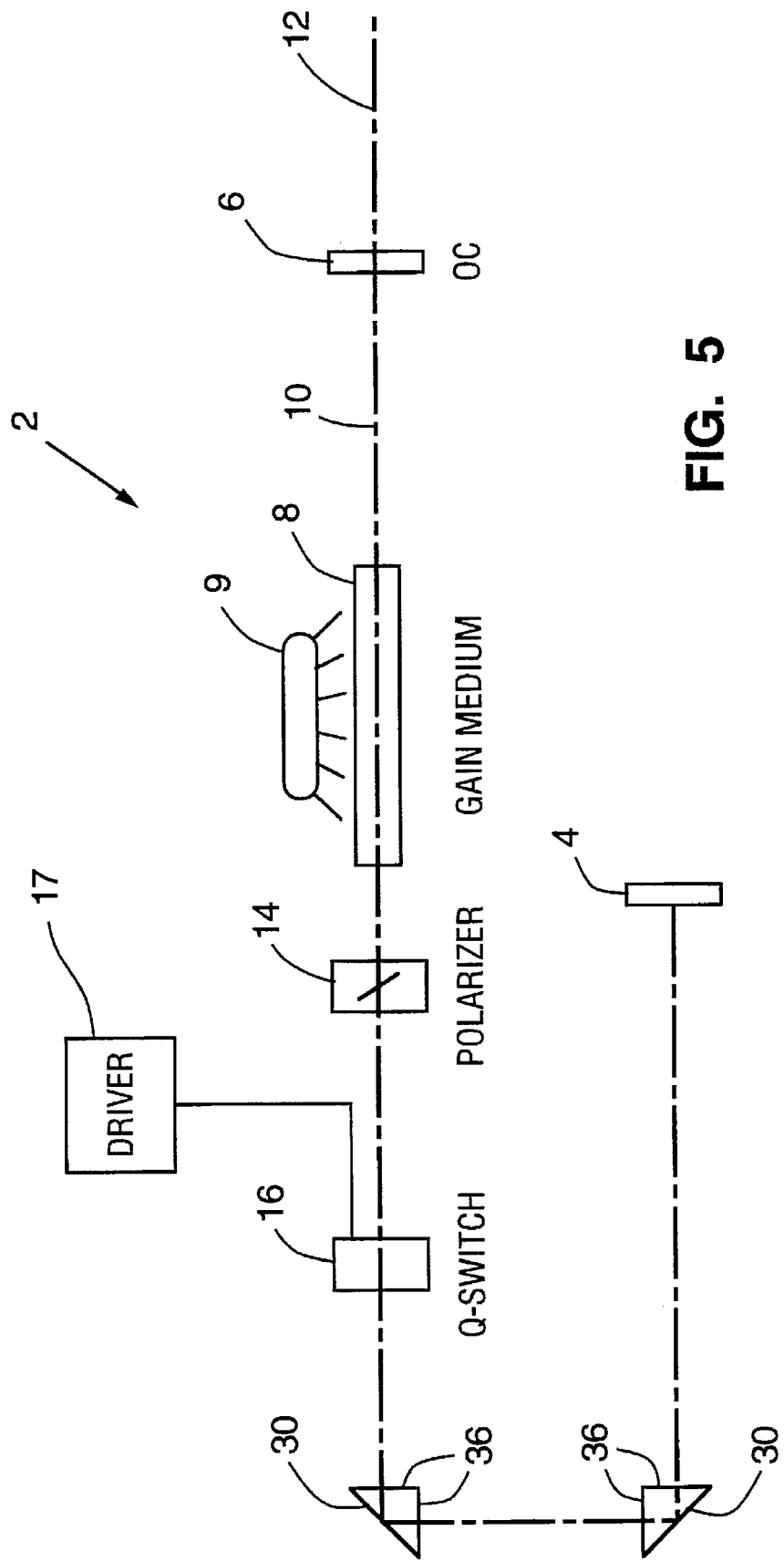
FIG. 5 is a top plan view of a folded Q-switched laser cavity of the present invention.

The preferred embodiment of the present invention is a folded cavity, Q-switched laser system 2, as shown in FIG. 5.

The resonant cavity is formed by a high reflecting mirror (HR) 4, two turning prisms 30, and an output coupling mirror (OC) 6. Inside the cavity there is a gain medium 8, a polarizer 14, and a Q-switch electro-optic cell (EO cell) 16.

The polarizer 14 produces an intracavity beam 10 linearly polarized in a preferred direction. Since the laser will naturally oscillate with light polarized in the orientation having the highest intracavity gain, the polarizer 14 effectively rejects the polarization component orthogonal to the preferred polarization direction by introducing loss to that orthogonal component. The polarizer 14 transmits the preferred polarization component with virtually no loss.

Figure 6:
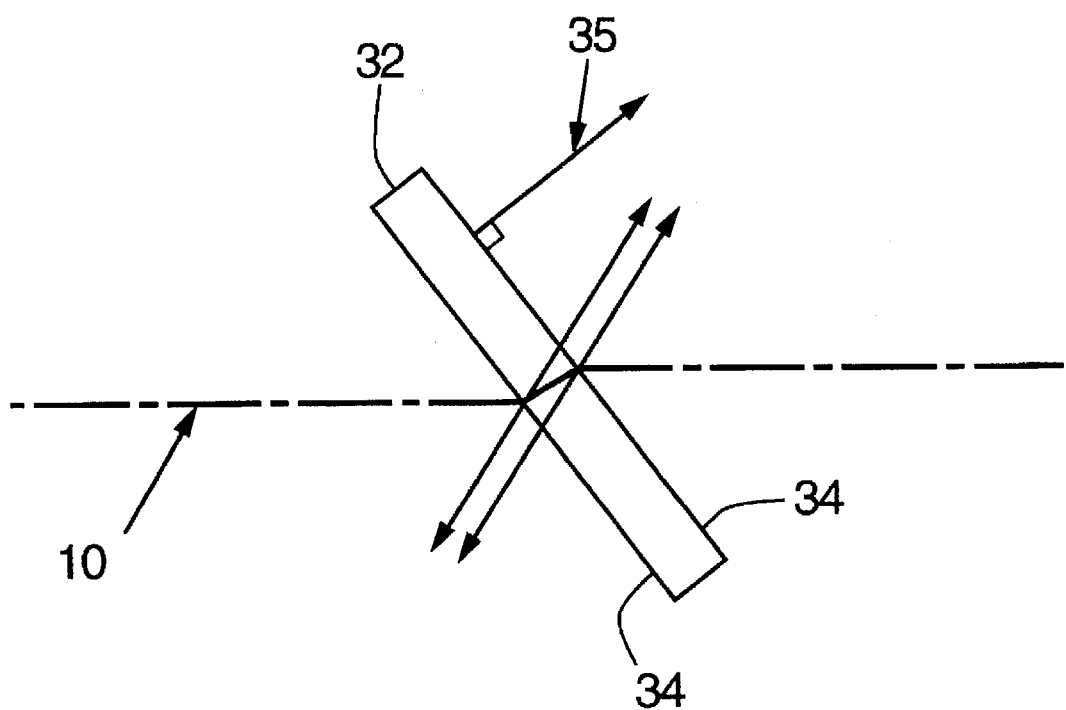
FIG. 6 is a side view of a conventional Brewster plate polarizer.

A commonly used polarizer is a Brewster plate polarizer 32, as shown in FIG. 6. A Brewster plate polarizer 32 is a transparent plate, such as glass or fused silica, that is tipped at "Brewster's Angle" relative to the beam 10 in one axis only. The Brewster plate polarizer defines a plane of incidence, which is the plane defined by the input beam 10 and the normal vector 35 (to the plate surface 34). The incident light has two orthogonal polarization components, S and P. The S component is perpendicular to the plane of incidence, and the P component is parallel (or in) the plane of incidence The S component of the beam 10 is partially reflected at both plate surfaces 34. The P component (preferred direction) of the beam 10 is transmitted through the plate 32 with virtually no loss. There are four reflected beams illustrated by FIG. 6 because the beam 10 is travelling in both directions.

The loss caused by the S component reflections at the plate 32 is usually enough to prevent the S component of light from circulating in the cavity. If greater losses are required, such as in higher gain lasers, one or both of the plate surfaces 34 can be coated to increase the reflectivity for the S polarization component of the light.

As discussed below, it is desirous that the linearly polarized intracavity beam 10 have equal vertical and horizontal components. Therefore, the axis in which the plate 32 is tipped at Brewster's angle, which is in the plane of the plate 32, is 45° from vertical.

The EO cell 16 is placed between the Brewster plate polarizer 32 and the prisms 30. Materials such as KD*P or lithium niobate serve as excellent Q-switch cells. Driver 17 applies high voltage to the EO cell 16, causing the EO cell 16 to have a fast axis and an orthogonal slow axis. The EO cell 16 is rotated about the beam so that the fast and slow axes are oriented 45° to the direction of the P polarization component passed by the Brewster plate polarizer 32.

Turning prisms 30 are used to fold the cavity by reflecting the intracavity beam 10 by total internal reflection (TIR). The prisms 30 are each oriented to turn the beam 90° in the horizontal plane. The prisms 30 are made of glass having a refractive index of 1.56.

A total internal reflection phase shifts the two polarization components of the incident light in a controllable way, as discussed in "Principles of Optics" by Max Born and Emil Wolf, Pergamon Press, sixth edition, 1980, p. 50. The amount of relative phase shift is expressed by:

$$\tan\frac{\delta}{2} = \frac{\cos\theta(\sin^2\theta - 1/n^2)^{1/2}}{\sin^2\theta} \quad (1)$$

where $\delta$ is the optical phase shift between the S and P components (at the TIR face), n is the refractive index of the optical material, and $\theta$ is the angle of incidence on the TIR surface. Therefore, as can be seen by the above formula, if the prisms are formed with material having a refractive index of 1.56, and the angle of incidence at the TIR surface is 45°, then the phase shift per TIR is 45°.

When no voltage is on the EO cell 16, the EO cell 16 has no effect on the polarization of the beam 10. The beam 10 reflects through both prisms 30, the HR 4, and back through both prisms 30 in each round trip through the cavity, thereby encountering four TIR's that result in a total phase shift of 180°. Since the beam 10 is polarized 45° from the vertical, the beam 10 has equal S and P components. Therefore, the 180° phase shift corresponds to a 90° rotation of the linear polarization direction of the beam 10 (See FIG. 2). The rotated beam 10 is rejected by the Brewster plate polarizer 32 which holds off the laser.

When the "quarter-wave" voltage is applied by driver 17 to the EO cell 16, the EO cell 16 shifts the phase between the polarization components of beam 10 by 90° per pass (180° during each round trip). Therefore, with the EO cell 16 on, the prisms 30 and the EO cell 16 combine to provide a total phase shift of 360° during each round trip, which results in a 180° rotation of the linear polarization direction. The 180° rotated beam is linearly polarized light in the same direction as the original beam. Therefore, the 180° rotated beam is transmitted by the Brewster plate polarizer 32 without loss. Thus, the laser is switched on when the EO cell 16 is turned on.

To decrease intracavity losses, the prisms 30 are coated with an antireflection coating on surfaces 36 where the intracavity beam 10 enters and exits the prisms 30. As the angle of reflection changes, so too should the prism shape such that surfaces 36 are normal to the intracavity beam 10 to minimize intracavity loss.

Pursuant to the present invention, the preferred embodiment described above can be altered in terms of the turning angle(s), number of prisms, Brewster plate polarizer orientation, and prism refractive index so long as the combination can intermittently hold off and turn on the laser by operating the EO cell 16. For example, a single prism having the appropriate refractive index and angle of incidence can be used to fold the beam to cause a 180° phase shift. Alternately, 3 or more prisms with the appropriate refractive index (or different indices) and angles of incidence can be used to fold the beam to cause the 180° phase shift. Lastly, the EO cell 16 could alternate between two different voltages that result in different phase shifts.

The preferred embodiment can also be altered to generate the light pulse when the EO cell 16 is off, and hold off the laser when the EO cell 16 is on. For example, adding a quarter-wave plate, and/or making appropriate changes regarding turning angle(s), number of prisms, Brewster plate polarizer orientation, and prism refractive index such that there is a total phase delay of 360°, 720°, etc. in each round trip when the EO cell 16 is off.

Figure 7:
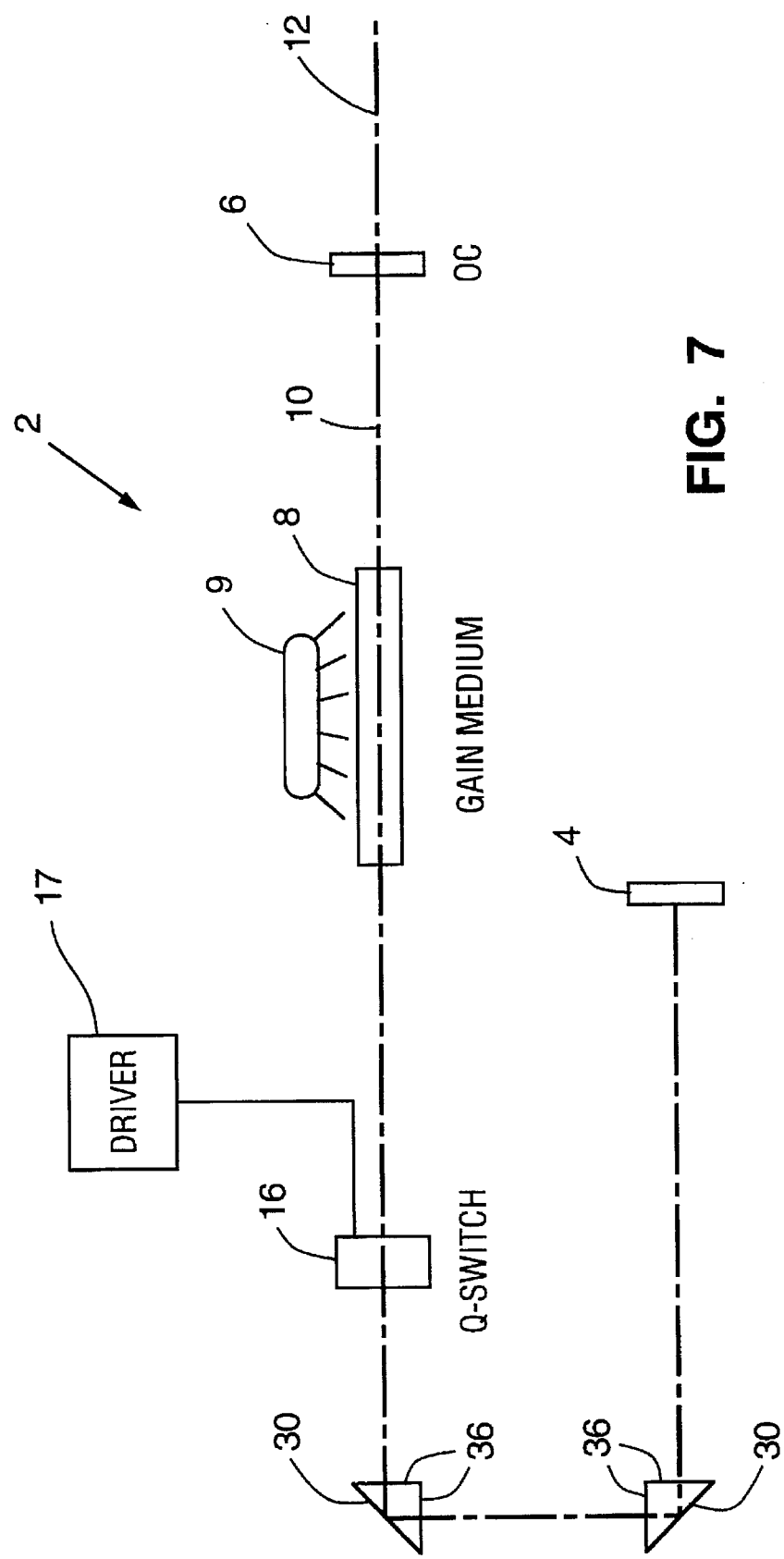
FIG. 7 is a plan view of a second embodiment of a folded Q-switched laser cavity of the present invention where the gain medium preferentially amplifies only one polarization component.

In a second embodiment of the present invention, the gain medium 8 negates the need for the polarizer, as illustrated in FIG. 7. Certain materials used as the gain medium 8, such as Alexandrite, have a preferred crystal axis such that light polarized along this axis experiences higher gain than light polarized orthogonally.

The Alexandrite gain medium (FIG. 7) is oriented in the cavity to preferentially amplify one of the two orthogonal polarization components that are oriented 45° to the vertical. With the EO cell 16 turned on in the Alexandrite laser, both of the orthogonal polarization components experience either a 180° polarization rotation, or no net polarization rotation, in each round trip. Therefore, the light component having its polarization direction aligned with the Alexandrite for amplification is preferentially amplified on every round trip. The result is that the laser is turned on. When the Q-switch cell is turned off, both orthogonal polarization components of the light beam 10 experience a polarization rotation of 90° on each round trip, so they exchange places each round-trip. The average round-trip gain for multiple passes is now lower, and the average gain is insufficient to overcome the intracavity losses (including high output coupling mirror transmission out of the cavity).

The above described embodiments illustrate how the EO cell 16 induces an additional phase shift to the phase shift caused by the prisms to yield a total phase shift of 360°. By swapping the slow and fast axis of the EO cell (by rotating the EO cell 16 by 90° or switching the voltage leads on the cell), the EO cell 16 will induce a negative phase shift (relative to the prism induced phase shift), which in effect subtracts out the phase shift induced by the prisms on the beam 10. In that case, there is a 0° net phase shift in each round trip when the EO cell 16 is on, yielding the same effect as a 360° phase shift in each round trip.

In practice, it may not be possible to use prisms with a refractive index that induces a total phase shift of 180°, either because of availability or because glass with that exact index incurs optical damage in Q-switched lasers. However, prisms having a refractive index that induce a total phase shift of somewhere near 180° can sometimes still hold off the laser. In such a case, to turn "on" the laser, the voltage applied to the EO cell and the EO cell orientation in the cavity must be chosen to either induce a phase shift equal and opposite to that induced by the prisms to result in a net induced phase shift of 0° in each round trip, or to induce a phase shift which, when combined with the prism induced phase shift, results in a net induced phase shift of 360° in each round trip.

The Applicant has produced an Alexandrite laser system as shown in FIG. 7 that outputs 0.75 J pulses at 10 Hz. The Q-switch cell 16 is made of KD*P with an applied voltage of ~2000 volts. The EO cell 16 turns on in about 30 ns, and is kept on for about 1 microsecond. The output coupling mirror 6 is coated to reflect 35% and transmit 65% of the intracavity beam 10. The Alexandrite rod is 4×90 mm, and is excited by a 1.2 Kw flashlamp. The prisms 30 are of BK-7 from Schott Optical Glass Inc., having a refractive index of 1.51, and were oriented to turn the beam 90° per reflection (45° angle of incidence). The 1.51 refractive index and 45° angle of incidence result in a total prism induced phase shift of 154°, which is sufficient to hold off the laser. The applied voltage to the EO cell and the EO cell orientation were selected to result in subtracting the 154° phase shift from the cavity when the EO cell is turned on.

It is to be understood that the present invention is not limited to the embodiments described above and illustrated herein, but encompasses any and all variations falling within the scope of the appended claims.

I claim:

1. A Q-switched laser system comprising:

a resonant cavity;

a gain medium inside said cavity;

means for exciting said gain medium to create a laser beam inside said cavity;

polarizer means inside said cavity for linearly polarizing said laser beam;

prism means inside said cavity including at least one prism having a reflecting surface for folding said beam incident thereon at an angle of incidence through total internal reflection, and wherein the index of refraction of said prism means and the angular orientation of said reflecting surface of said prism means relative to said beam is selected to induce a first predetermined phase shift to said beam according to:

$$\tan\frac{\delta}{2} = \frac{\cos\theta(\sin^2\theta - 1/n^2)^{1/2}}{\sin^2\theta}$$

where δ is the first predetermined phase shift, n is the refractive index of said prism means, and θ is said angle of incidence; and a Q-switch cell inside said cavity having an on state and an off state, said Q-switch cell selectively inducing a second predetermined phase shift to said laser beam when in said on state and no phase shift to said laser beam when in said off state, wherein when said Q-switch cell is in said off state said first predetermined phase shift reduces roundtrip gain within said cavity to suppress laser oscillation, and when said Q-switch cell is in said on state said first and second predetermined phase shifts combine to allow said laser to oscillate.

2. The laser system of claim 1 wherein said first predetermined phase shift causes said polarizer means to increase intracavity loss which suppresses laser oscillation, and said first and second predetermined phase shifts combine to cause said polarizer means to minimize intracavity loss thereby permitting laser oscillation.

3. The laser system of claim 2 wherein said first and said second predetermined phase shifts combine to produce substantially 0° net phase shift to said beam during each round trip said laser beam completes in said resonant cavity.

4. The laser system of claim 2 wherein said first and said second predetermined phase shifts combine to result in a substantially 360° net phase shift to said beam during each round trip said laser beam completes in said resonant cavity.

5. The laser system of claim 2 wherein said first predetermined phase shift to said laser beam is substantially 180° during each round trip said laser beam completes in said resonant cavity.

6. The laser system of claim 5 wherein said second predetermined phase shift to said laser beam is substantially 180° during each round trip said laser beam completes in said resonant cavity.

7. The laser system of claim 6 wherein said Q-switch cell is a KD*P electro-optic cell.

8. The laser system of claim 7 wherein said polarizer means is a brewster plate polarizer.

9. The laser system of claim 8 wherein said brewster plate polarizer has a reflective coating.

10. The laser system of claim 7 wherein said polarizer means is the gain medium.

11. The laser system of claim 10 wherein said gain medium is Alexandrite.

12. The Q-switched laser system of claim 1 wherein:
said resonant cavity is formed in a single plane; and
said prism means orientation is selected so that every total internal reflection in said prism means is in a direction parallel to said single plane of the resonant cavity.

13. A Q-switched laser system comprising:
a resonant cavity;
a gain medium inside said cavity;
means for exciting said gain medium to create a laser beam inside said cavity;
polarizer means inside said cavity for linearly polarizing said laser beam;
prism means inside said cavity including at least one prism having a reflective surface for folding said beam incident thereon at an angle of incidence through total internal reflection, and wherein the index of refraction of said prism means and the angular orientation of said reflective surface of said prism means relative to said beam is selected to induce a first predetermined phase shift to said beam according to:

$$\tan\frac{\delta}{2} = \frac{\cos\theta(\sin^2\theta - 1/n^2)^{1/2}}{\sin^2\theta}$$

where δ is the first predetermined phase shift, n is the refractive index of said prism means, and θ is said angle of incidence; and a Q-switch cell inside said cavity having an on state and an off state, said Q-switch cell selectively inducing a second predetermined phase shift to said laser beam when in said on state and no phase shift to said laser beam when in said off state, wherein when said Q-switch cell is in said off state said first predetermined phase shift is selected to allow laser oscillation, and when said Q-switch cell is in said on state said first and second predetermined phase shifts combine to reduce roundtrip gain within said cavity to suppress laser oscillation.

14. The laser system of claim 13 wherein said first and second predetermined phase shifts combine to cause said polarizer means to increase intracavity loss which suppresses laser oscillation, and said first predetermined phase shift alone causes said polarizer means minimize intracavity loss thereby permitting laser oscillation.

15. The laser system of claim 14 further comprising:
a quarter-wave plate inside said cavity.

16. The laser system of claim 12 wherein said first and said second predetermined phase shifts combine to produce substantially 0° net phase shift to said beam during each round trip said laser beam completes in said resonant cavity.

17. The laser system of claim 12 wherein said first and said second predetermined phase shifts combine to result in a substantially 360° net phase shift to said beam during each round trip said laser beam completes in said resonant cavity.

18. The laser system of claim 12 wherein said first predetermined phase shift to said laser beam is substantially 180° during each round trip said laser beam completes in said resonant cavity.

19. The laser system of claim 18 wherein said second predetermined phase shift to said laser beam is substantially 180° during each round trip said laser beam completes in said resonant cavity.

20. The laser system of claim 19 wherein said Q-switch cell is a KD*P electro-optic cell.

21. The laser system of claim 20 wherein said polarizer means is a brewster plate polarizer.

22. The laser system of claim 21 wherein said brewster plate polarizer has a reflective coating.

23. The laser system of claim 20 wherein said polarizer means is the gain medium.

24. The laser system of claim 23 wherein said gain medium is Alexandrite.

25. The Q-switched laser system of claim 13 wherein:
said resonant cavity is formed in a single plane; and
said prism means orientation is selected so that every total internal reflection in said prism means is in a direction parallel to said single plane of the resonant cavity.

26. A folded cavity Q-switched laser system comprising:
a resonant cavity;
a gain medium inside said cavity;
means for exciting said gain medium to create a laser beam inside said cavity;

polarizer means inside said cavity for linearly polarizing said laser beam;

two prisms inside said cavity each having a reflective surface for folding said beam incident thereon at an angle of incidence through total internal reflection wherein the index of refraction of said prisms and the angular orientation of said reflective surfaces of said prisms relative to said beam are selected to induce a first predetermined phase shift to said beam for each roundtrip said beam makes through said resonant cavity, said first predetermined phase shift resulting from a plurality of reflection phase shifts according to:

$$\tan\frac{\delta}{2} = \frac{\cos\theta(\sin^2\theta - 1/n^2)^{1/2}}{\sin^2\theta}$$

that occur at said total internal reflections, where $\delta$ is said reflection phase shift, n is the refractive index of said prisms, and $\theta$ is said angle of incidence, wherein the laser beam passes through each of said prisms twice during each of said roundtrips, and said prisms each turning said laser beam by substantially 90° during each total internal reflection;

a Q-switch cell in said cavity between said prisms and said polarizer for selectively inducing a second predetermined phase shift to said laser beam, said Q-switch cell having an on state and an off state; and said Q-switch cell inducing said second predetermined phase shift when in said on state, and said Q-switch cell inducing no phase shift when in said off state;

wherein when said Q-switch cell is in said off state said first predetermined phase shift reduces roundtrip gain within said cavity to suppress laser oscillation, and when said Q-switch cell is in said on state said first and second predetermined phase shifts combine to allow said laser to oscillate.

27. The laser system of claim 26 wherein said polarizer means is a brewster plate polarizer.

28. The laser system of claim 27 wherein said brewster plate polarizer has a reflective coating.

29. The laser system of claim 26 wherein said polarizer means is the gain medium.

30. The laser system of claim 29 wherein said gain medium is Alexandrite.

31. The folded cavity Q-switched laser system of claim 26 wherein:

said resonant cavity is formed in a single plane; and said prisms are oriented so that each of said total internal reflections in said prisms is in a direction parallel to said single plane of the resonant cavity.

32. A Q-switched laser system comprising:

a resonant cavity;

a gain medium inside said cavity;

means for exciting said gain medium to create a laser beam inside said cavity;

polarizer means inside said cavity for linearly polarizing said laser beam;

prism means inside said cavity including at least one prism having a reflecting surface for folding said beam incident thereon at an angle of incidence through total internal reflection, and wherein the index of refraction of said prism means and the angular orientation of said reflecting surface of said prism means relative to said beam is selected to induce a first predetermined phase shift to said beam according to:

$$\tan\frac{\delta}{2} = \frac{\cos\theta(\sin^2\theta - 1/n^2)^{1/2}}{\sin^2\theta}$$

where $\delta$ is the first predetermined phase shift, n is the refractive index of said prism means, and $\theta$ is said angle of incidence; and a Q-switch having first and second states wherein during the first state the Q-switch induces a second predetermined phase shift and during the second state the Q-switch induces a third predetermined phase shift which combine with the first predetermined phase shift and wherein laser oscillation is suppressed when said Q-switch is in one of said first and second states by reducing roundtrip gain within said cavity and wherein the laser is allowed to oscillate when the Q-switch is in the other state.

33. The Q-switched laser system of claim 32 wherein laser oscillation is suppressed when said Q-switch is in said first state.

34. The Q-switched laser system of claim 32 wherein laser oscillation is suppressed when said Q-switch is in said second state.

35. The Q-switched laser system of claim 32 wherein said second predetermined phase shift is 0°.

36. The Q-switched laser system of claim 32 wherein:

said resonant cavity is formed in a single plane; and said prism means orientation is selected so that every total internal reflection in said prism means is in a direction parallel to said single plane of the resonant cavity.

* * * * *